(12) United States Patent
Lösch et al.

(10) Patent No.: US 8,748,512 B2
(45) Date of Patent: Jun. 10, 2014

(54) METHOD FOR PRODUCING POLYMER PARTICLES BY THE POLYMERIZATION OF LIQUID DROPLETS IN A GAS PHASE

(75) Inventors: Dennis Lösch, Altrip (DE); Annemarie Hillebrecht, Künzell (DE); Marco Krüger, Mannheim (DE); Stefan Blei, Mannheim (DE); Matthias Weismantel, Jossgrund-Oberndorf (DE); Wilfried Heide, Freinsheim (DE)

(73) Assignee: BASF SE, Ludwigshafen (DE)

( * ) Notice: Subject to any disclaimer, the term of this patent is extended or adjusted under 35 U.S.C. 154(b) by 739 days.

(21) Appl. No.: 12/523,479

(22) PCT Filed: Feb. 4, 2008

(86) PCT No.: PCT/EP2008/051337
§ 371 (c)(1),
(2), (4) Date: Jul. 16, 2009

(87) PCT Pub. No.: WO2008/095893
PCT Pub. Date: Aug. 14, 2008

(65) Prior Publication Data
US 2010/0016505 A1  Jan. 21, 2010

(30) Foreign Application Priority Data

Feb. 6, 2007 (EP) ..................... 07101837

(51) Int. Cl.
C09B 67/00 (2006.01)
C08K 3/00 (2006.01)
C08K 5/00 (2006.01)
C08L 25/00 (2006.01)
C08L 23/00 (2006.01)

(52) U.S. Cl.
CPC ............ *C08K 3/0016* (2013.01); *C08K 5/0025* (2013.01); *C08L 2201/54* (2013.01); *C08L 25/00* (2013.01); *C08L 23/00* (2013.01)
USPC .............. 523/330; 524/804; 524/849; 525/55

(58) Field of Classification Search
CPC ..... C08L 23/00; C08L 25/00; C08L 2201/54; C08K 3/0016; C08K 5/0025
USPC .............. 523/200, 330; 522/1; 250/434, 435; 524/423, 804, 849; 525/55
See application file for complete search history.

(56) References Cited

U.S. PATENT DOCUMENTS

| | | | |
|---|---|---|---|
| 5,269,980 A | 12/1993 | Levendis et al. | |
| 5,478,879 A | 12/1995 | Kajikawa et al. | |
| 6,103,785 A | 8/2000 | Kajikawa et al. | |
| 6,414,052 B1 | 7/2002 | Komura et al. | |
| 7,727,586 B2 * | 6/2010 | Bruhns et al. | 427/213 |
| 2002/0171159 A1 | 11/2002 | Matthaei et al. | |
| 2008/0188586 A1 | 8/2008 | Bruhns et al. | |
| 2009/0192035 A1 * | 7/2009 | Stueven et al. | 502/402 |
| 2009/0258994 A1 * | 10/2009 | Stueven et al. | 525/55 |
| 2010/0324212 A1 * | 12/2010 | Stueven et al. | 524/789 |
| 2011/0111231 A1 * | 5/2011 | Kruger et al. | 428/402 |

FOREIGN PATENT DOCUMENTS

| | | |
|---|---|---|
| EP | 0 496 594 A2 | 7/1992 |
| EP | 0945143 A2 | 9/1999 |
| WO | WO-01/81450 A1 | 11/2001 |
| WO | WO-2006/079631 A1 | 8/2006 |
| WO | WO-2007/093531 A1 | 8/2007 |

OTHER PUBLICATIONS

International Preliminary Report on Patentability (English translation) for corresponding PCT/EP2008/051337, dated Sep. 8, 2009.
International Search Report for PCT/EP2008/051337, dated May 19, 2008.

* cited by examiner

*Primary Examiner* — Hannah Pak
(74) *Attorney, Agent, or Firm* — Marshall, Gerstein & Borun, LLP

(57) ABSTRACT

A process for producing polymer particles by polymerizing liquid droplets in a gas phase surrounding the droplets, said droplets comprising at least one monomer and being coated with particulate solids during the polymerization.

6 Claims, No Drawings

METHOD FOR PRODUCING POLYMER PARTICLES BY THE POLYMERIZATION OF LIQUID DROPLETS IN A GAS PHASE

CROSS-REFERENCE TO RELATED APPLICATIONS

This is the U.S. national phase of International Application No. PCT/EP2008/051337, filed Feb. 4, 2008, which claims the benefit of European Patent Application No. 07101837.8, filed Feb. 6, 2007.

The present invention relates to a process for producing polymer particles by polymerizing liquid droplets in a gas phase surrounding the droplets, comprising at least one monomer and being coated with particulate solids during the polymerization.

U.S. Pat. No. 5,269,980 describes a process for polymerizing chains of monodisperse droplets in a surrounding heat gas phase. The droplet chains are generated by virtue of the solution to be polymerized passing through a multitude of bores of defined size.

WO 2006/079631 A1 teaches the production of water-absorbing polymer particles by polymerizing chains of monodisperse droplets in a surrounding heated gas phase. The polymer particles obtained can then be agglomerated.

Polymerization of liquid droplets in a gas phase allows the process steps of polymerization and drying to be combined. In addition, the particle size can be adjusted within certain limits by virtue of suitable process control.

EP 0 496 594 A2 discloses a process for producing water-absorbing polymer particles, undersize occurring during the process being recycled into the polymerization.

EP 0 945 143 A2 discloses a process for coating water-absorbing polymer particles with water-absorbing polymer particles, the polymer particles used for the coating being more highly crosslinked.

It was an object of the present invention to provide an improved process for producing polymer particles by polymerizing liquid droplets in a gas phase surrounding the droplets.

In particular, it was an object of the present invention to provide a process which is not very susceptible to faults and permits a high yield.

This object was achieved by a process for producing polymer particles by polymerizing liquid droplets comprising at least one monomer in a gas phase surrounding the droplets, wherein the droplets are coated with particulate solids during the polymerization.

The coating allows the formation of agglomerates and wall deposits during the polymerization to be prevented.

Especially in the polymerization of monomer solutions, excessively rapidly drying leads to low monomer conversions. On the other hand, polymer particles with a high solvent content are also tackier and therefore also have an increased tendency to form agglomerates and wall deposits.

Coating with particulate solids allows the formation of agglomerates and wall deposits to be suppressed.

The mean diameter of the droplets generated is preferably at least 200 μm, more preferably at least 250 μm, most preferably at least 300 μm, the droplet diameter being determinable by light scattering.

The diameter of the particulate solids is preferably less than 200 μm, more preferably less than 150 μm, most preferably less than 100 μm, the particle diameter being determinable by light scattering.

The particulate solids may also themselves be polymer particles.

In a preferred embodiment of the process according to the invention, polymer particles which inevitably occur in the process, for example as a result of polymerization of excessively small droplets or attritus, are used and recycled into the process in this way.

The type of coating is not subject to any restriction. For example, it is possible to perform the polymerization in the presence of a cycle gas and to predisperse the particulate solid in the cycle gas. However, it is also possible to meter the particulate solids into the reaction chamber by means of one or more two-substance nozzles.

In one embodiment of the present invention, the particulate solids are metered in in a region where the monomer conversion is less than 90 mol %, preferably less than 75 mol %, more preferably less than 60 mol %, most preferably less than 45 mol %. To determine the monomer conversion, the polymerizing droplets, at the point where the particulate solid is added, are collected in a suitable solvent comprising a suitable polymerization inhibitor. Subsequently, the monomer content of the collected droplets can be determined by customary methods. In the case of low monomer conversions, the particulate solids can penetrate more deeply into the droplets and are bound more firmly. Moreover, it is also possible to incorporate larger proportions of particulate solids.

In a further embodiment of the present invention, the polymerizing droplets fall into a fluidized bed and the coating with the particulate solid is not performed until within the fluidized bed. Owing to the longer residence time, the coating yield in this case is higher.

It will be appreciated that combinations of the aforementioned embodiments are also possible.

The type of monomers and their concentration in the liquid are not subject to any restriction. For instance, it is possible to polymerize monomers in bulk or as a solution in a suitable solvent, for example methanol, diethyl ether or water. In the process according to the invention, preference is given to using ethylenically unsaturated monomers.

Ethylenically unsaturated monomers are, for example, ethylenically unsaturated $C_3$-$C_6$-carboxylic acids. These compounds are, for example, acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid and fumaric acid, and also the alkali metal or ammonium salts of these acids.

Further suitable monomers are acrylamidopropanesulfonic acid, vinylphosphonic acid and/or alkali metal or ammonium salts of vinylphosphonic acid, and acids are used either in non-neutralized form or in partially or up to 100% neutralized form.

In addition, monoethylenically unsaturated sulfonic acids or phosphonic acids are useful as monomers, for example allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, allylphosphonic acid, styrenesulfonic acid and 2-acryloamido-2-methylpropanesulfonic acid.

Further suitable monomers, for example, acrylamide, methacrylamide, crotonamide, acrylonitrile, methacrylonitrile, diethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate, and also quaternization products thereof, for example with methyl chloride, hydroxyethyl acrylate, hydroxyethyl methacrylate, hydroxypropyl acrylate and hydroxypropyl methacrylate.

Further suitable monomers are monomers which are obtainable by reacting nitrogen-containing heterocycles and/or carboxamides, such as vinylimidazole, vinylpyrazole, and also vinylpyrrolidone, vinylcaprolactam and vinylformamide, with acetylene, which may also be quaternized, for example with methyl chloride, and monomers which are obtainable by reacting nitrogen compounds, such as diallyldimethylammonium chloride, with allyl alcohol or allyl chloride.

In addition, it is also possible to use vinyl and allyl esters and vinyl and allyl ethers, such as vinyl acetate, allyl acetate, methyl vinyl ether and methyl allyl ether, as monomers.

The monomers may be used alone or in a mixture with one another, for example mixtures comprising two or more monomers.

The process according to the invention is suitable, for example, for producing water-absorbing polymer particles. The production of water-absorbing polymer particles is described in the monograph "Modern Superabsorbent Polymer Technology", F. L. Buchholz and A. T. Graham, Wiley-VCH, 1998, pages 71 to 103.

Being products which absorb aqueous solutions, water-absorbing polymers are used to produce diapers, tampons, sanitary napkins and other hygiene articles, but also as water-retaining agents in market gardening.

The droplets generated comprise preferably
a) at least one ethylenically unsaturated monomer,
b) at least one crosslinker,
c) at least one initiator and
d) water.

During the coating, the water content of the droplets to be polymerized is preferably at least 15% by weight, more preferably at least 30% by weight, even more preferably at least 45% by weight. To determine the water content, the polymerizing droplets are collected at the point where the particulate solid is added. Subsequently, the water content of the collected droplets can be determined by customary methods, for example Karl-Fischer titration.

In a preferred embodiment of the present invention, the particulate solids used for the coating are themselves water-absorbing polymer particles.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 50 g/100 g of water, and preferably have at least one acid group each.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

The preferred monomers a) have at least one acid group, the acid groups preferably being at least partly neutralized.

The proportion of acrylic acid and/or salts thereof in the total amount of monomers a) is preferably at least 50 mol %, more preferably at least 90 mol %, most preferably at least 95 mol %.

The acid groups of the monomers a) are typically partly neutralized, preferably to an extent of from 25 to 85 mol %, preferentially to an extent of from 50 to 80 mol %, more preferably from 60 to 75 mol %, for which the customary neutralizing agents can be used, preferably alkali metal hydroxides, alkali metal oxides, alkali metal carbonates or alkali metal hydrogencarbonates, and mixtures thereof. Instead of alkali metal salts, it is also possible to use ammonium salts. Sodium and potassium are particularly preferred as alkali metals, but very particular preference is given to sodium hydroxide, sodium carbonate or sodium hydrogencarbonate, and mixtures thereof. Typically, the neutralization is achieved by mixing in the neutralizing agent as an aqueous solution, as a melt or preferably also as a solid. For example, sodium hydroxide with a water content significantly below 50% by weight may be present as a waxy material having a melting point above 23° C. In this case, metered addition as piece material or melt at elevated temperature is possible.

The monomers a), especially acrylic acid, comprise preferably up to 0.025% by weight of a hydroquinone monoether. Preferred hydroquinone monoethers are hydroquinone monomethyl ether (MEHQ).

The monomer solution comprises preferably at most 160 ppm by weight, preferentially at most 130 ppm by weight, more preferably at most 70 ppm by weight, preferably at least 10 ppm by weight, more preferably at least 30 ppm by weight, in particular around 50 ppm by weight, of hydroquinone monoether, based in each case on acrylic acid, acrylic acid salts also being considered as acrylic acid. For example, the monomer solution can be prepared by using acrylic acid having an appropriate content of hydroquinone monoether.

Crosslinkers b) are compounds having at least two free-radically polymerizable groups which can be polymerized by a free-radical mechanism into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and in DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/32962 A2.

Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and vinylphosphonic acid derivatives, as described, for example, in EP 343 427 A2. Further suitable crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 300 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, in particular di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of 40-tuply ethoxylated glycerol, of 40-tuply ethoxylated trimethylolethane or of 40-tuply ethoxylated trimethylolpropane.

Very particularly preferred crosslinkers b) are the polyethoxylated and/or -propoxylated glycerols which have been esterified with acrylic acid or methacrylic acid to give di- or triacrylates, as described, for example in WO 2003/104301 A1. Di- and/or triacrylates of 3- to 10-tuply ethoxylated glycerol are particularly advantageous.

Very particular preference is given to di- or triacrylates of 1- to 5-tuply ethoxylated and/or propoxylated glycerol. Most preferred are the triacrylates of 3- to 5-tuply ethoxylated and/or propoxylated glycerol.

The monomer solution comprises preferably at least 0.1% by weight, preferentially at least 0.2% by weight, more preferably at least 0.3% by weight, most preferably at least 0.4% by weight, of crosslinker b), based in each case on monomer a).

The initiators c) used may be all compounds which decompose into free radicals under the polymerization conditions, for example peroxides, hydroperoxides, hydrogen peroxide, persulfates, azo compounds and the so-called redox initiators. Preference is given to the use of water-soluble initiators. In some cases, it is advantageous to use mixtures of different initiators, for example mixtures of hydrogen peroxide and sodium peroxodisulfate or potassium peroxodisulfate. Mixtures of hydrogen peroxide and sodium peroxodisulfate can be used in any desired ratio.

Particularly preferred initiators c) are azo initiators, such as 2,2'-azobis[2-(2-imidazolin-2-yl)propane]dihydrochloride and 2,2'-azobis[2-(5-methyl-2-imidazolin-2-yl)propane]dihydrochloride, and photoinitiators such as 2-hydroxy-2-methylpropiophenone and 1-[4-(2-hydroxyethoxy)phenyl]-2-hydroxy-2-methyl-1-propan-1-one, redox initiators such as sodium persulfate/hydroxymethylsulfinic acid, ammonium peroxodisulfate/hydroxymethylsulfinic acid, hydrogen peroxide/hydroxymethylsulfinic acid, sodium persulfate/ascorbic acid, ammonium peroxodisulfate/ascorbic acid and hydrogen peroxide/ascorbic acid, photoinitiators such as 1-[4-(2-hydroxyethoxy)-phenyl]-2-hydroxy-2-methyl-1-propan-1-one, and mixtures thereof.

The initiators are used in customary amounts, for example in amounts of from 0.001 to 5% by weight, preferably 0.01 to 1% by weight, based on the monomers a).

The polymerization inhibitors can also be removed by absorption, for example on activated carbon.

The solids content of the monomer solution is preferably at least 35% by weight, preferentially at least 38% by weight, more preferably at least 40% by weight, most preferably at least 42% by weight. The solids content is the sum of all constituents which are involatile after the polymerization. These are monomer a), crosslinker b) and initiator c).

The oxygen content of the monomer solution is preferably at least 1 ppm by weight, more preferably at least 2 ppm by weight, most preferably at least 5 ppm by weight. The customary inertization of the monomer solution can therefore substantially be dispensed with.

The increased oxygen content stabilizes the monomer solution and enables the use of smaller amounts of polymerization inhibitor and thus reduces the product discolorations caused by the polymerization inhibitor.

The monomer solution is metered into the gas phase for the polymerization. The oxygen content of the gas phase is preferably from 0.001 to 0.15% by volume, more preferably from 0.002 to 0.1% by volume, most preferably from 0.005 to 0.05% by volume.

In addition to oxygen, the gas phase comprises preferably only inert gases, i.e. gases which do not intervene in the polymerization under reaction conditions, for example nitrogen and/or steam.

Preference is given to generating chains of substantially monodisperse droplets, for example, by means of a dropletizer plate or a dropletizer tube.

A dropletizer plate is a plate having at least one bore, the liquid entering the bore from the top. The dropletizer plate or the liquid can be oscillated, which generates a chain of ideally monodisperse droplets at each bore on the underside of the dropletizer plate.

A dropletizer tube is a tube having at least one bore, the liquid entering the bore from the top. The dropletizer tube or the liquid can be oscillated, which generates a chain of ideally monodisperse droplets at each bore on the underside of the dropletizer tube.

The number and size of the bores are selected according to the desired capacity and droplet size. The droplet diameter is typically 1.9 times the diameter of the bore. What is important here is that the liquid to be dropletized does not pass through the bore too rapidly and the pressure drop over the bore is not too great. Otherwise, the liquid is not dropletized, but rather the liquid jet is broken up (sprayed) owing to the high kinetic energy. The dropletizer is operated in the flow range of laminar jet decomposition, i.e. the Reynolds number based on the throughput per bore and the bore diameter is preferably less than 2000, preferentially less than 1000, more preferably less than 500 and most preferably less than 100. The pressure drop through the bore is preferably less than 2.5 bar, more preferably less than 1.5 bar and most preferably less than 1 bar.

The diameter of the bores is adjusted to the desired droplet size. The droplets generated have a mean droplet size of preferably at least 200 μm, more preferably of at least 250 μm and most preferably of at least 300 μm, the droplet diameter being determinable by means of light scattering.

However, the dropletization can also be carried out by means of pneumatic drawing dies, rotation, cuffing of a jet or rapidly actuable microvalve dies.

In a pneumatic drawing die, a liquid jet together with a gas stream is accelerated through a diaphragm. The gas rate can be used to influence the diameter of the liquid jet and hence the droplet diameter.

In the case of dropletization by rotation, the liquid passes through the orifices of a rotating disk. As a result of the centrifugal force acting on the liquid, droplets of defined size are torn off. Preferred apparatus for rotary dropletization are described, for example, in DE 43 08 842 A1.

The emerging liquid jet can also be cut into defined segments by means of a rotating blade. Each segment then forms a droplet.

In the case of use of microvalve dies, droplets with defined liquid volume are generated directly.

The gas phase preferably flows through the reaction chamber as carrier gas. The carrier gas can be conducted through the reaction chamber in cocurrent or in countercurrent to the free-falling droplets of the monomer solution, preferably in cocurrent. After one pass, the carrier gas is preferably recycled at least partly, preferably to an extent of at least 50%, more preferably to an extent of at least 75%, into the reaction chamber as cycle gas. Typically, a portion of the carrier gas is discharged after each pass, preferably up to 10%, more preferably up to 3% and most preferably up to 1%.

The gas velocity is preferably adjusted such that the flow in the polymerization reactor is directed, for example no convection currents opposed to the general flow direction are present, and is, for example, from 0.01 to 5 m/s, preferably from 0.02 to 4 m/s, more preferably from 0.05 to 3 m/s, most preferably from 0.1 to 2 m/s.

The gas flowing through the reactor is appropriately preheated to the reaction temperature upstream of the reactor.

The reaction temperature in the thermally induced polymerization is preferably from 100 to 250° C., more preferably from 120 to 200° C. and most preferably from 150 to 180° C.

The reaction can be carried out under elevated pressure or under reduced pressure; preference is given to a reduced pressure of up to 100 mbar relative to ambient pressure.

The reaction offgas, i.e. the gas leaving the reaction chamber, may, for example, be cooled in a heat exchanger. This condenses water and unconverted monomer a). The reaction offgas can then be reheated at least partly and recycled into the reactor as cycle gas. A portion of the reaction offgas can be discharged and replaced by fresh gas, in which case water and unconverted monomers a) present in the reaction offgas can be removed and recycled.

Particular preference is given to a thermally integrated system, i.e. a portion of the waste heat in the cooling of the offgas is used to heat the cycle gas.

The reactors can be trace-heated. In this case, the trace heating is adjusted such that the wall temperature is at least 5° C. above the internal reactor temperature and condensation on the reactor walls is reliably prevented.

The reaction product can be removed from the reactor in a conventional manner and optionally dried down to the desired residual moisture content and to the desired residual monomer content.

The reaction product is preferably dried in at least one fluidized bed.

The polymer particles can subsequently be postcrosslinked for further improvement of the properties.

Postcrosslinkers are compounds which comprise at least two groups which can form covalent bonds with the carboxylate groups of the hydrogel. Suitable compounds are, for example, alkoxysilyl compounds, polyaziridines, polyamines, polyamidoamines, di- or polyepoxides, as described in EP 83 022 A2, EP 543 303 A1 and EP 937 736 A2, di- or polyfunctional alcohols as described in DE 33 14 019 A1, DE 35 23 617 A1 and EP 450 922 A2, or β-hydroxyalkylamides, as described in DE 102 04 938 A1 and U.S. Pat. No. 6,239,230.

In addition, DE 40 20 780 C1 describes cyclic carbonates, DE 198 07 502 A1 describes 2-oxazolidone and its derivatives such as 2-hydroxyethyl-2-oxazolidone, DE 198 07 992 C1 describes bis- and poly-2-oxazolidinones, DE 198 54 573 A1 describes 2-oxotetrahydro-1,3-oxazine and its derivatives, DE 198 54 574 A1 describes N-acyl-2-oxazolidones, DE 102 04 937 A1 describes cyclic ureas, DE 103 34 584 A1 describes bicyclic amide acetals, EP 1 199 327 A2 describes oxetanes and cyclic ureas, and WO 2003/31482 A1 describes morpholine-2,3-dione and its derivatives, as suitable postcrosslinkers.

The amount of postcrosslinker is preferably from 0.01 to 1% by weight, more preferably from 0.05 to 0.5% by weight, most preferably from 0.1 to 0.2% by weight, based in each case on the polymer.

The postcrosslinking is typically performed in such a way that a solution of the postcrosslinker is sprayed onto the hydrogel or the dry polymer particles. The spraying is followed by thermal drying, and the postcrosslinking reaction can take place either before or during the drying.

The spraying of a solution of the crosslinker is preferably performed in mixers with moving mixing tools, such as screw mixers, paddle mixers, disk mixers, plowshare mixers and shovel mixers. Particular preference is given to vertical mixers, very particular preference to plowshare mixers and shovel mixers. Suitable mixers are, for example, Lödige mixers, Bepex mixers, Nauta mixers, Processall mixers and Schugi mixers.

The thermal drying is preferably carried out in contact dryers, more preferably paddle dryers, most preferably disk dryers. Suitable dryers are, for example, Bepex dryers and Nara dryers. Moreover, it is also possible to use fluidized bed dryers.

The drying can be effected in the mixer itself, by heating the jacket or blowing in warm air. Equally suitable is a downstream dryer, for example a staged dryer, a rotary tube oven or a heatable screw. It is particularly advantageous to mix and dry in a fluidized bed dryer.

Preferred drying temperatures are in the range from 170 to 250° C., preferably from 180 to 220° C. and more preferably from 190 to 210° C. The preferred residence time at this temperature in the reaction mixer or dryer is preferably at least 10 minutes, more preferably at least 20 minutes, most preferably at least 30 minutes.

The process according to the invention enables the production of water-absorbing polymer particles with constant properties.

The water-absorbing polymer particles obtainable by the process according to the invention have a centrifuge retention capacity (CRC) of typically at least 15 g/g, preferably at least 20 g/g, preferentially at least 25 g/g, more preferably at least 30 g/g and most preferably at least 35 g/g. The centrifuge retention capacity (CRC) of the water-absorbing polymer particles is typically less than 100 g/g. The centrifuge retention capacity of the water-absorbing polymer particles is determined by the EDANA (European Disposables and Nonwovens Association) recommended test method No. 441.2-02 "Centrifuge retention capacity".

The mean diameter of the water-absorbing polymer particles obtainable by the process according is preferably at least 200 μm, more preferably from 250 to 600 μm, very particularly from 300 to 500 μm, the particle diameter being determinable by light scattering and meaning the volume-average mean diameter. 90% of the polymer particles have a diameter of preferably from 100 to 800 μm, more preferably from 150 to 700 μm and most preferably from 200 to 600 μm.

The invention claimed is:

1. A process for producing water absorbing polymer particles by polymerizing liquid droplets comprising a solution comprising of a) at least one ethylenically unsaturated monomer, b) at least one crosslinker, c) at least one polymerization initiator, and d) water, wherein said at least one monomer is in a gas phase surrounding the droplets, and wherein the droplets are coated with particulate solids during the polymerization and wherein the particulate solids are metered into the polymerization in a region where monomer conversion is less than 45 mol %, the particulate solids being recycled polymer particles having a diameter of less than 200 μm.

2. The process according to claim 1, wherein the droplets have a mean diameter of at least 200 μm.

3. The process according to claim 1, wherein the coating is performed in a fluidized bed.

4. The process according to claim 1, wherein the monomer a) is an acrylic acid to an extent of at least 50 mol %.

5. The process according to claim 1, wherein the droplets comprise at least 0.1% by weight of the crosslinker b), based on monomer a).

6. Water-absorbing polymer particles prepared by the process of claim 1.

* * * * *